United States Patent
Sarkar et al.

(10) Patent No.: US 12,166,870 B2
(45) Date of Patent: Dec. 10, 2024

(54) PHYSICAL UNCLONABLE FUNCTION FAILURE PROTECTION AND PREDICTION

(71) Applicant: Micron Technology, Inc., Boise, ID (US)

(72) Inventors: Sourin Sarkar, Bangalore (IN); Vamshikrishna Komuravelli, Rangareddy (IN)

(73) Assignee: Micron Technology, Inc., Boise, ID (US)

( * ) Notice: Subject to any disclaimer, the term of this patent is extended or adjusted under 35 U.S.C. 154(b) by 316 days.

(21) Appl. No.: 17/725,178

(22) Filed: Apr. 20, 2022

(65) Prior Publication Data

US 2023/0344624 A1 Oct. 26, 2023

(51) Int. Cl.
*H04L 9/32* (2006.01)
*H04L 9/08* (2006.01)

(52) U.S. Cl.
CPC .......... *H04L 9/0866* (2013.01); *H04L 9/3278* (2013.01)

(58) Field of Classification Search
None
See application file for complete search history.

(56) References Cited

U.S. PATENT DOCUMENTS

| | | | |
|---|---|---|---|
| 10,044,514 B1* | 8/2018 | Peterson | H04L 9/0894 |
| 2015/0098268 A1* | 4/2015 | Yabuuchi | G11C 11/418 |
| | | | 365/154 |
| 2015/0234751 A1* | 8/2015 | Van Der Sluis | G06F 12/1408 |
| | | | 713/193 |
| 2016/0364583 A1* | 12/2016 | Benoit | H04L 9/3278 |
| 2018/0123808 A1* | 5/2018 | Hung | H04L 9/0866 |
| 2018/0278418 A1* | 9/2018 | Chang | H04L 9/0891 |
| 2019/0221139 A1* | 7/2019 | Schrijen | H04L 9/0866 |
| 2020/0034549 A1* | 1/2020 | Lu | H04L 9/30 |
| 2020/0052912 A1* | 2/2020 | Lu | H04L 9/30 |
| 2020/0186339 A1* | 6/2020 | Hung | G06F 3/068 |
| 2020/0350012 A1* | 11/2020 | Yoshimoto | G11C 7/24 |
| 2021/0326490 A1* | 10/2021 | Zalivaka | G06F 11/1068 |
| 2024/0056316 A1* | 2/2024 | Best | H04L 9/3278 |

* cited by examiner

*Primary Examiner* — Christopher C Harris
(74) *Attorney, Agent, or Firm* — Harrity & Harrity, LLP

(57) ABSTRACT

In some implementations, a memory device may generate a physical unclonable function (PUF) value. The memory device may access a PUF protection key stored in a non-host-addressable memory region. The memory device may encrypt the PUF value, using the PUF protection key, to generate an encrypted PUF value. The memory device may store the encrypted PUF value in scattered memory locations in the non-host-addressable memory region.

14 Claims, 9 Drawing Sheets

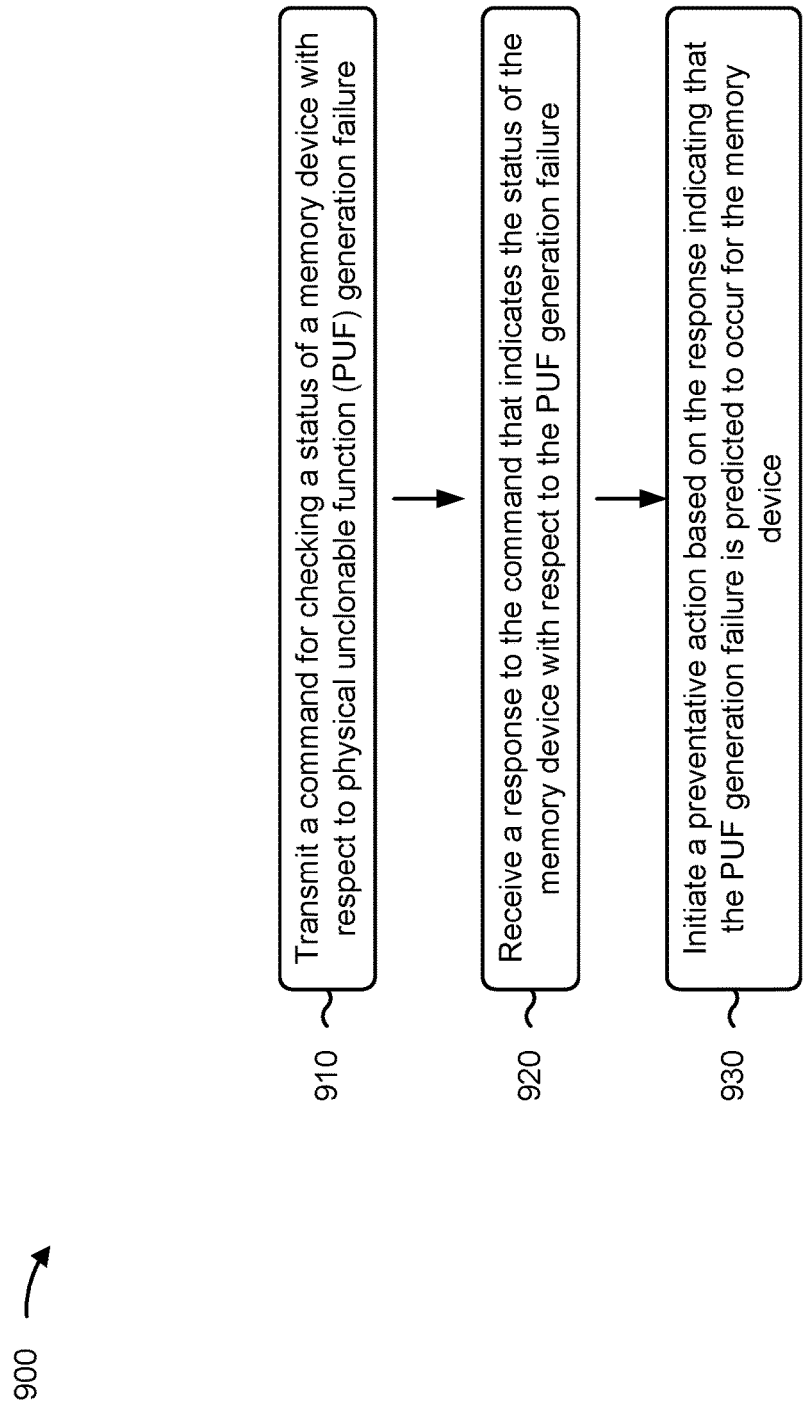

PHYSICAL UNCLONABLE FUNCTION FAILURE PROTECTION AND PREDICTION

TECHNICAL FIELD

The present disclosure generally relates to memory devices, memory device operations, and, for example, physical unclonable function failure protection and prediction for memory devices.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "$V_{era}$," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

BRIEF DESCRIPTION OF THE DRAWINGS

FIGS. 6-9 are flowcharts of example methods associated with PUF failure protection and prediction.

DETAILED DESCRIPTION

Figure 1:
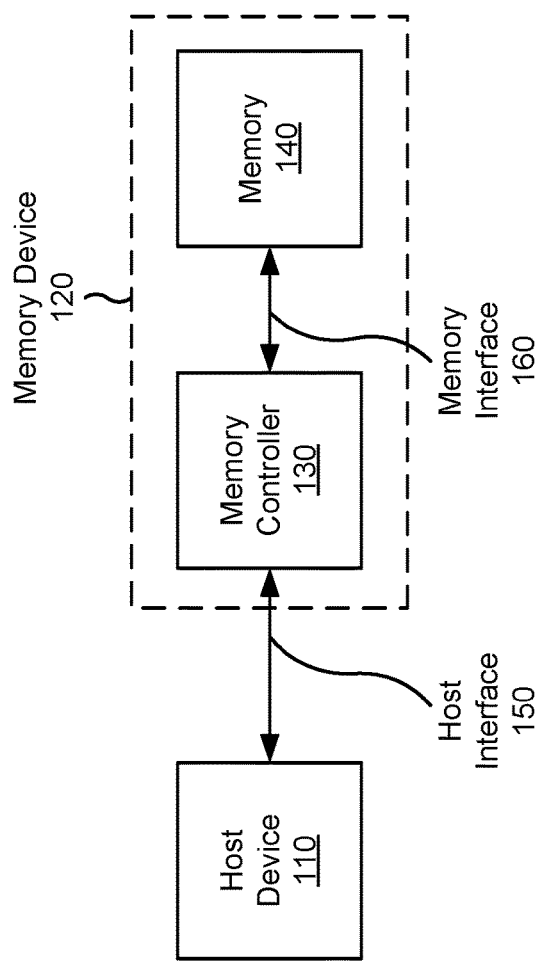
FIG. 1 is a diagram illustrating an example system capable of physical unclonable function (PUF) failure protection and prediction.

Device identification and authentication may be important for security operations in electronics. For example, a computing device may validate that a component connected to the computing device is authentic to prevent access to the computing device by a malicious entity. One technique for uniquely identifying a component is to provide a physical identifier. For example, a physical identifier may be disposed on a component using a masking technique or a laser etching technique. In this case, a computing device may read the physical identifier to verify that an attached component is a genuine component and not from a malicious entity. However, in some cases the physical identifier can be read and cloned to create a malicious duplicate of a genuine component. For example, a malicious entity may use x-ray techniques to read the physical identifier and clone the physical identifier onto a malicious duplicate of a component. In this case, the computing device may incorrectly identify the malicious duplicate as a genuine component based on the malicious duplicate having the unique physical identifier disposed thereon.

To avoid such attacks, some computing devices may use a physical unclonable function (PUF). A PUF is a physical object or component that provides a unique identifier as an output for a given input and has one or more properties that make the PUF difficult or impractical to duplicate. A PUF may receive an electrical input, an optical input, a radio frequency (RF) input, or a magnetic input, among other examples, and a physical structure of the PUF converts the input into a unique output. As a result, a first PUF will have a different output than a second PUF given the same input.

A first PUF and a second PUF may differ with regard to one or more structural parameters, which may result in each PUF having a different output. For example, a magnetic stripe card may have a magnetic media that includes particles of a magnetic material deposited in a random manner during manufacture. As a result, a first magnetic stripe will have a different pattern than a second magnetic stripe. A detector can detect differences in outputs by the first magnetic stripe and the second magnetic stripe based on respective deposition patterns, thereby enabling differentiation. Because the patterns of magnetic particles are created randomly during the deposition process, it is nearly impossible to artificially create a matching magnetic stripe. In other words, even upon inspection of a physical structure of a PUF, it may be impossible to recreate the exact conditions that result in a given output from a given input, thereby providing the unclonability property for the PUF.

Some other example types of PUFs include optical PUFs, in which scattered light creates unique patterns that can be measured, quantum PUFs, in which spatial variations in a bandgap can be measured using photoluminescence techniques, and radio frequency PUFs, in which frequency errors or offsets or I-Q imbalance can be measured.

Another feature of PUFs that enhances security for computing devices is that a PUF generally only provides a unique identifier when in operation. For example, a magnetic stripe only provides an output based on the magnetic stripe's unique structure when being used. Similarly, optical PUFs only provide their unique light patterns when being used. As a result, the transient nature of an output from such PUFs can reduce an ability to even identify the unique identifier that is to be duplicated. Accordingly, use of a PUF can deter attacks by malicious entities.

A memory device, such as a NAND memory device, may be provided with a dedicated PUF, such as a static random access memory (SRAM) PUF or a ring oscillator PUF. In the case of a ring oscillator, the memory device may include a string of inverters, which may have power applied and counter values measured as a unique identifier. In the case of an SRAM PUF, an integrated circuit of a memory device may include a region dedicated for providing an SRAM array for use as a dedicated PUF. In operation, cells of the SRAM array are resolved to a set of initial '1's or '0's (termed "initial values"), the pattern of which forms a unique identifier for the memory device that includes the SRAM array. These PUF generation techniques for memory devices are provided as examples, and a PUF may be generated for a memory device using one or more other techniques.

As described above, the PUF may output a unique value that is difficult or impossible for a malicious entity (e.g., an intruder) to duplicate. The intruder may not be able to access the memory device without knowledge of the PUF value. Therefore, to reduce the likelihood of an attack by the intruder, the PUF value should not be stored in the memory device. However, not storing the PUF value in the memory device may result in certain disadvantages. For example, if the PUF were to fail (e.g., due to noise), the memory device may become unusable. Without the PUF value, it may not be possible to access data that is stored within the memory device. Additionally, there may be no way to detect that the PUF will fail or to detect when the PUF is approaching a fail state. Thus, the memory device may become unusable without any notice to the host device or to a user of the host device.

Some implementations described herein enable PUF protection and storage. A memory device may be configured to access a PUF protection key that is stored in a non-host-addressable memory region of the memory device, encrypt a PUF value using the PUF protection key, and store the encrypted PUF value in scattered memory locations of the non-host-addressable memory region. In some implementations, the memory device may be configured to generate a byte string that includes the encrypted PUF value and the PUF protection key, and to store the byte string in the scattered memory locations of the non-host-addressable memory. As a result, the PUF value may be securely stored in the memory device to prevent memory device failure, while reducing or eliminating the likelihood of the PUF value being obtained by an intruder.

Some implementations described herein enable PUF failure prediction. The memory device may be configured to receive a command for checking a status of the memory device with respect to a PUF generation failure, and to transmit a response to the command that indicates the status of the memory device. The status of the memory device may indicate a number of PUF generation cycles performed by the memory device, a flag that indicates whether the PUF generation failure is predicted to occur, a number of times that the flag has been set, and/or an indication that the memory device is in a recovery mode. The host device may take one or more preventative actions to prevent data loss from the memory device, such as transferring data from the memory device or replacing the memory device.

FIG. 1 is a diagram illustrating an example system 100 capable of PUF failure protection and prediction. The system 100 may include one or more devices, apparatuses, and/or components for performing operations described herein (e.g., for PUF failure protection and/or prediction). For example, the system 100 may include a host device 110 and a memory device 120. The memory device 120 may include a memory controller 130 and memory 140. The host device 110 may communicate with the memory device 120 (e.g., the memory controller 130 of the memory device 120) via a host interface 150. The memory controller 130 and the memory 140 may communicate via a memory interface 160.

The system 100 may be any electronic device configured to store data in memory. For example, the system 100 may be a computer, a mobile phone, a wired or wireless communication device, a network device, a server, and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, and/or an embedded multimedia card (eMMC) device.

The memory controller 130 may be any device configured to communicate with the host device (e.g., via the host interface 150) and the memory 140 (e.g., via the memory interface 160). Additionally, or alternatively, the memory controller 130 may be configured to control operations of the memory device 120 and/or the memory 140. For example, the memory controller 130 may include an ASIC, an FPGA, a processor, a microcontroller, and/or one or more processing components.

In some implementations, the memory 140 may include non-volatile memory configured to maintain stored data after the memory device 120 is powered off. For example, the memory 140 may include NAND memory or NOR memory. Additionally, or alternatively, the memory 140 may include volatile memory that requires power to maintain stored data and that loses stored data after the memory device 120 is powered off. For example, the memory 140 may include one or more latches and/or random-access memory (RAM), such as dynamic RAM (DRAM) and/or static RAM (SRAM).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, a Non-Volatile Memory Express (NVMe) interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory controller 130 may be configured to access a PUF protection key from a non-host-addressable memory region of the memory device 120 (e.g., of the memory 140). The memory controller 130 may generate a PUF value, encrypt the PUF value using the PUF protection key, and store a byte string (e.g., in the memory 140) that includes the encrypted PUF value and the PUF protection key in scattered locations of the non-host-addressable memory region of the memory device 120. In some implementations, the memory device 120 may receive a command for checking a status of the memory device 120 with respect to a PUF generation failure, and may transmit a response to the host device 110. The host device 110 may initiate one or more preventative actions based on the response.

As indicated above, FIG. 1 is provided as an example. Other examples may differ from what is described with regard to FIG. 1.

Figure 2:
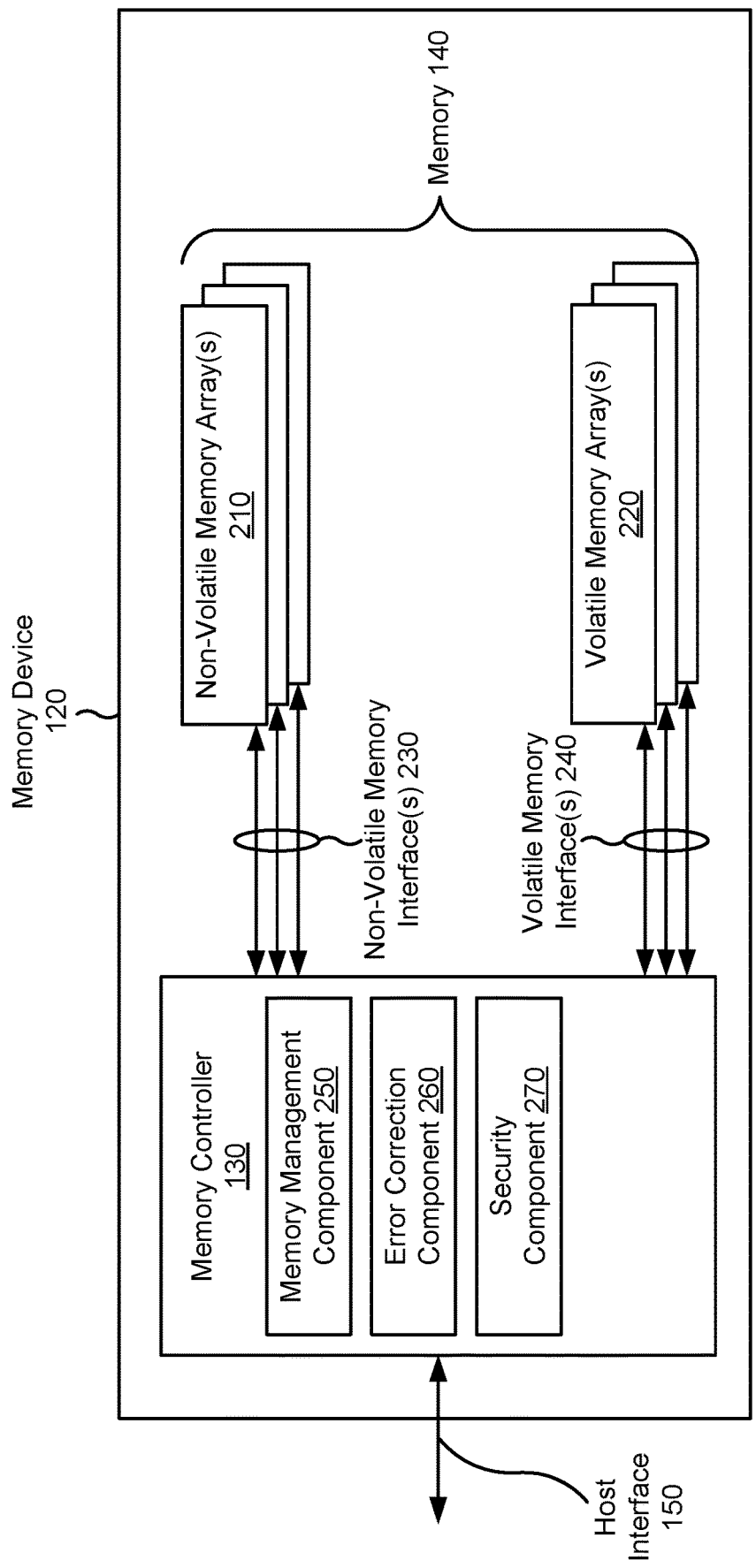
FIG. 2 is a diagram of example components included in a memory device.

FIG. 2 is a diagram of example components included in the memory device 120 of FIG. 1. As described above in connection with FIG. 1, the memory device 120 may include a memory controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The memory controller 130 may transmit signals to and receive signals from a non-volatile memory array 210 using a non-volatile memory interface 230. The memory controller 130 may transmit signals to and receive signals from a volatile memory array 220 using a volatile memory interface 240.

The memory controller 130 may control operations of the memory 140, such as by executing one or more instructions. For example, the memory device 120 may store one or more instructions in the memory 140 as firmware, and the memory controller 130 may execute those one or more instructions. Additionally, or alternatively, the memory controller 130 may receive one or more instructions from the host device 120 via the host interface, and may execute those one or more instructions. In some implementations, a non-transitory computer-readable medium (e.g., volatile memory and/or non-volatile memory) may store a set of instructions (e.g., one or more instructions or code) for execution by the memory controller 130. The memory controller 130 may execute the set of instructions to perform one or more operations or methods described herein. In some implementations, execution of the set of instructions, by the memory controller 130, causes the memory controller 130 and/or the memory device 120 to perform one or more operations or methods described herein. In some implementations, hardwired circuitry is used instead of or in combination with the one or more instructions to perform one or more operations or methods described herein. Additionally, or alternatively, the memory controller 130 and/or one or more components of the memory device 120 may be configured to perform one or more operations or methods described herein. An instruction is sometimes called a "command."

For example, the memory controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the memory controller 130 may be configured to control access to the memory 140 and/or to provide a translation layer between the host device 110 and the memory 140 (e.g., for mapping logical addresses to physical addresses of a memory array). In some implementations, the memory controller 130 may translate a host interface command (e.g., a command received from the host device 110) into a memory interface command (e.g., a command for performing an operation on a memory array).

As shown in FIG. 2, the memory controller 130 may include a memory management component 250, an error correction component 260, and/or a security component 270. In some implementations, one or more of these components are implemented as one or more instructions (e.g., firmware) executed by the memory controller 130. Alternatively, one or more of these components may be implemented as dedicated integrated circuits distinct from the memory controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The error correction component 260 may be configured to detect and/or correct errors associated with the memory device 120. For example, the error correction component 260 may be configured to detect and/or correct an error associated with writing data to or reading data from one or more memory cells of a memory array, such as a single-bit error (SBE) or a multi-bit error (MBE).

The security component 270 may be configured to perform one or more security operations for the memory device 120. For example, the security component 270 may be configured to encrypt or decrypt data, such as data read from the memory 140 and/or data to be written to the memory 140. Additionally, or alternatively, the security component 270 may be configured to validate commands received from the host device 120, such as by validating a cryptographic signature of a command (e.g., using one or more cryptographic keys).

Figure 3:
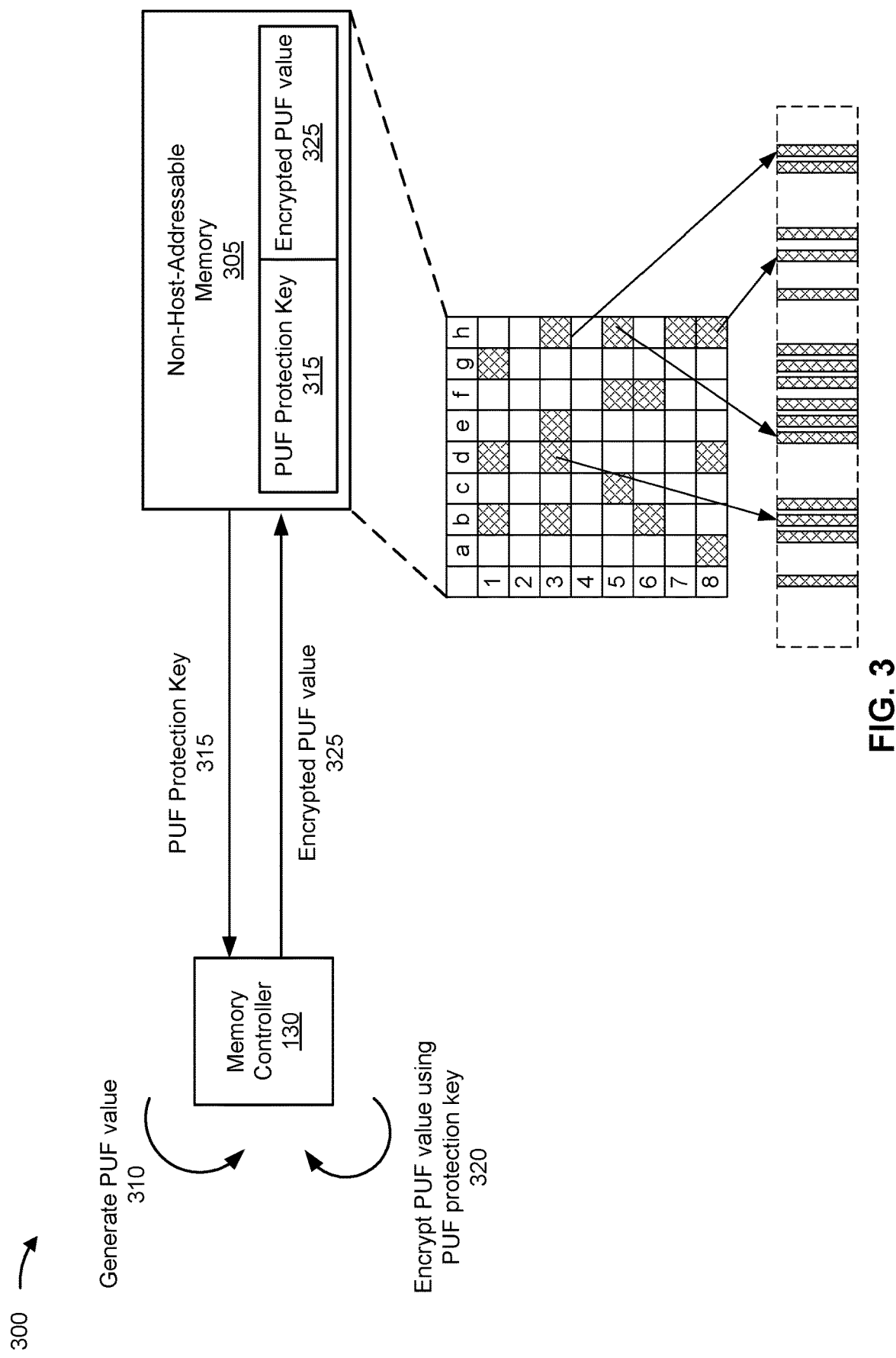
FIG. 3 is a diagram illustrating example operations for PUF failure protection.
Figure 4:
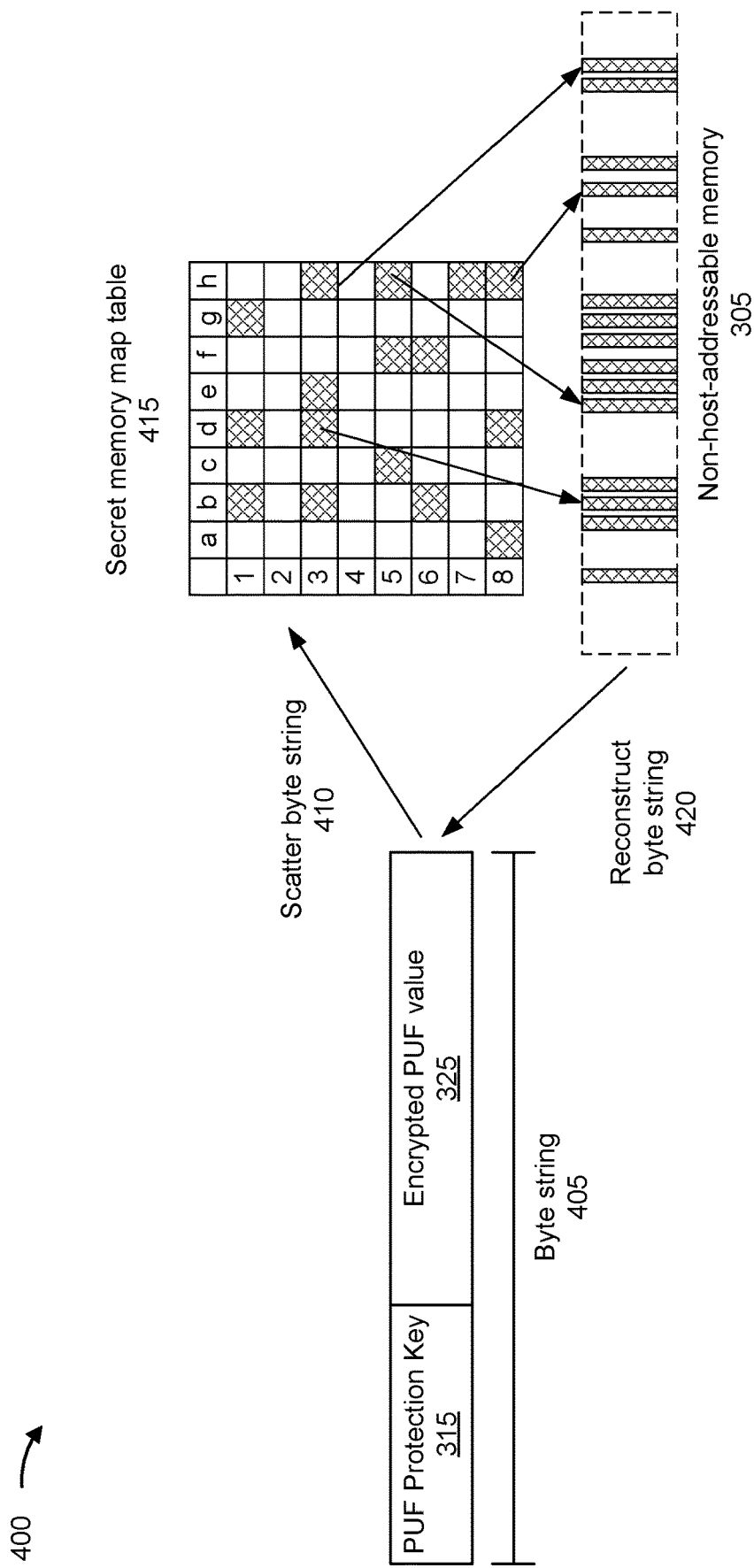
FIG. 4 is a diagram illustrating example operations for storing a byte string that includes an encrypted PUF value.
Figure 5:
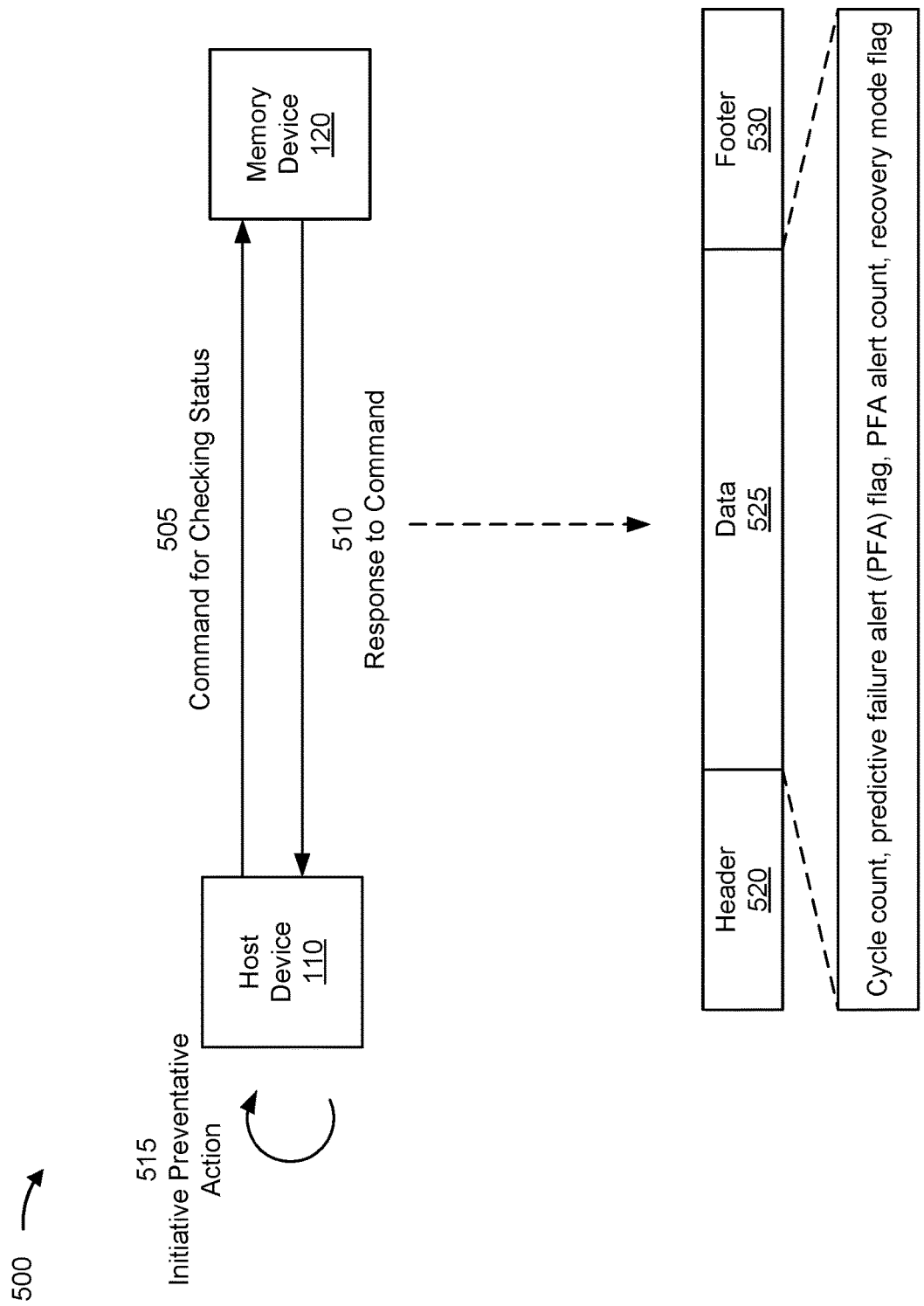
FIG. 5 is a diagram illustrating example operations for PUF failure prediction.

One or more devices or components shown in FIG. 2 may be used to carry out operations described elsewhere herein, such as one or more operations of FIGS. 3-5 and/or one or more process blocks of the methods of FIGS. 6-9. For example, the memory controller 130 and/or the security component 270 may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIG. 3 is a diagram illustrating example operations 300 for PUF failure protection. A memory controller, such as the memory controller 130, may communicate with a non-host-addressable memory, shown as non-host addressable memory 305. For example, the memory controller 130 may store data in the non-host addressable memory 305 and/or access data from the non-host addressable memory 305. The memory controller 130 and the non-host-addressable memory 305 may be located within the memory device 120. For example, the non-host-addressable memory 305 may be part of the memory 140 and/or a non-volatile memory array 210. For example, the non-host-addressable memory 305 may be inaccessible to the host device 110, and may only be accessible by the memory controller 130 and/or other components internal to the memory device 140. In some implementations, one or more block addresses of the non-host-addressable memory 305 may not exist in an address space accessible by the host device 110.

As shown by reference number 310, the memory controller 130 may generate a PUF value. The PUF value may be generated based on a PUF that is stored in the memory controller 130. For example, the memory 140 may store one or more instructions (e.g., a function, such as a PUF) for generating the PUF value. The memory controller 130 may execute the one or more instructions (e.g., the function, such as the PUF) to generate the PUF value. In some implementations, the memory controller 130 may generate the PUF value after the memory device 120 is powered on (e.g., based on initialization of the memory device 120). For example, the PUF value may be automatically generated based on the memory device 120 being powered on. In some implementations, the PUF value may be generated based on an SRAM PUF or a ring oscillator PUF. These PUF generation techniques for memory devices are provided as examples, and a PUF may be generated for a memory device using one or more other techniques.

As shown by reference number 315, the memory controller 130 may access a PUF protection key (e.g., a PUF protection private key). In some implementations, accessing the PUF protection key may include reading the PUF protection key from the memory 140. For example, the memory controller 130 may retrieve the PUF protection key from the non-host-addressable memory 305. In some implementations, the PUF protection key may be loaded in the non-host-addressable memory 305 at a time of manufacturing, and may never be used in any communication between the host device 110 and the memory device 120. The PUF protection key may never leave the memory device 120 in any form. In some implementations, the PUF protection key may never be visible or readable for any operation other than for encrypting the PUF value. Thus, in some implementations, the memory controller 130 may only access the PUF protection key if the memory controller 130 is performing an operation to encrypt a PUF value.

In some implementations, firmware associated with the memory device 120 may include the PUF protection key stored in the non-host-addressable memory 305. The PUF protection key may be predetermined and preprogrammed, and may be based on a design identifier and/or a part number associated with the memory device 120. Thus, different memory devices 120 may store different PUF protection keys to further enhance security. In some implementations, the PUF protection key may be accessed at certain increments. For example, the PUF protection key may be accessed once per time period (e.g., once per day, at a particular time each day, or the like). Additionally, or alternatively, the PUF protection key may be accessed each time the memory device 120 is powered on and generates an encrypted PUF.

As shown by reference number 320, the memory controller 130 may encrypt the PUF value using the PUF protection key. In some implementations, the memory controller 130 may generate a byte string based on encrypting the PUF value using the PUF protection key. For example, the memory controller 130 may encrypt the PUF value using the PUF protection key, and may generate the byte string using the encrypted PUF value. The byte string may be a long byte string. The long byte string may be (or may include) a string of numbers or characters that do not fit into standard (e.g., two byte, four byte, or eight byte) data stores. The long byte string may be an array of continuous number or characters, such as hexadecimal characters. In some implementations, the byte string may contain the PUF protection key and the encrypted PUF value, as shown.

As shown by reference number 325, the memory controller 130 may store the encrypted PUF value in the non-host-addressable memory 305. For example, the memory controller 130 may store the byte string that includes the PUF protection key and the encrypted PUF value in the non-host-addressable memory 305. In some implementations, the memory controller 130 may write the encrypted PUF value and/or the byte string (e.g., which includes both the encrypted PUF value and the PUF protection key) in scattered memory locations of the non-host-addressable memory 305. In some implementations, the memory controller 130 and/or the non-host-addressable memory 305 may maintain a secret memory map table that points to the scattered locations in the non-host-addressable memory 305. Additionally, the memory controller 130 and/or the non-host-addressable memory 305 may store one or more algorithms for interacting with the secret memory map table. Additional details regarding the algorithms for interacting with the secret memory map table are described in connection with FIG. 4. In some implementations, the PUF value may not be valid across power cycles. For example, the PUF value is not stored in a persistent memory, and powering off the memory device 120 may lead to the PUF value being invalid. Instead, a new PUF value may be generated when the memory device 120 is powered on (which should be the same as a previously-generated PUF value or similar to the previously-generated PUF value within a threshold tolerance).

As described above, an intruder may not be able to access the memory device 120 without knowledge of the PUF value. To reduce the likelihood of an attack by the intruder, the PUF value may not be stored in the memory device 120. However, not storing the PUF value in the memory device 120 may result in certain disadvantages. For example, if the PUF were to fail, the memory device 120 may become unusable since it may not be possible to access data that is stored within the memory device 120 without having a PUF value. In some implementations, the memory device 120 may be configured to encrypt the PUF value using the PUF protection key, and to store a byte string that includes the encrypted PUF value and the PUF protection key. As described herein, the memory device 120 may be configured to use the most recently encrypted PUF value to access data from within the memory device 120 in the event of a PUF failure. Thus, the data can be transferred from the memory device 120 even after the PUF has failed.

As indicated above, FIG. 3 is provided as an example. Other examples may differ from what is described with regard to FIG. 3.

FIG. 4 is a diagram illustrating example operations 400 for storing a byte string that includes an encrypted PUF value. One or more operations described in connection with FIG. 4 may be performed by the memory device 120 and/or the memory controller 130. Furthermore, the data stored, as described below, may be stored in memory 140.

As described above, the memory controller 130 may generate a byte string that includes a PUF protection key and an encrypted PUF value. For example, the byte string 405 (e.g., a long byte string) may include the PUF protection key 315 and the encrypted PUF value 325. The memory controller 130 may be configured to store the byte string 405 in the non-host-addressable memory 305, or may be configured to cause the byte string 405 to be stored in the non-host-addressable memory 305. Additionally, the memory controller 130 may be configured to access (e.g., retrieve) the byte string 405 from the non-host-addressable memory 305. In some implementations, the minimum number of bytes in the byte string may be at least double the number of bytes in the PUF protection key. The total number of bytes in the byte string may be dynamic and may be dependent on the application. In some implementations, the number of bytes in the encrypted PUF value may be larger than the number of bytes in the non-encrypted PUF value.

As shown by reference number 410, the memory controller 305 may be configured to store the byte string 405 using a scattering algorithm, such as a scatter to secret store algorithm. The memory controller 305 may store the byte string 405 using the secret memory map table 415. For example, the memory controller 305 may store the byte string 405 in a scattered fashion (e.g., based on the scattering algorithm). The secret memory map table 415 may be stored in the non-host-addressable memory 305.

In some implementations, the byte string 405 may be scattered in the non-host-addressable memory 305 using the secret memory map table 415 and the scattering algorithm. In some implementations, the scattering algorithm may provide a mapping for the byte string 405. For example, a first byte of the byte string 405 may be stored in a first location of the non-host-addressable memory 305, a second byte of the byte string 405 may be stored in a second location of the non-host-addressable memory 305, and so on. In some implementations, the byte string 405 may include a number of bits (or bytes). A region of the non-host-addressable memory 305 may be allocated for storing the number of bits (or bytes). A number of bits (or bytes) associated with the region of the non-host-addressable memory 305 may be greater than, or greater than or equal to, the number of bits (or bytes) associated with the byte string 405. The memory controller 130 may determine a respective memory location (e.g., that is within the region, or a subset of the region) to store each bit (or byte) based on one or more parameters that can change over time, such as a value of the bit, a value of the byte, or some function performed on the byte string 405 or a portion of the byte string 405, such as adding all the bytes and using a result to determine the memory location, or applying a hash function to the encrypted PUF value and using the result to determine the memory location, among other examples.

In some implementations, the byte string 405 may be mapped to the secret memory map table 415. For example, a first bit (or byte) of the byte string may be mapped to location a1 of the memory map table 415, a second bit (or byte) of the byte string may be mapped to location a2 of the memory map table 415, etc. The scattering algorithm may be used to scatter the mapped data from the secret memory map table 415 to random locations within the non-host addressable memory 305. For example, data that corresponds to location d3 of the memory map table may be stored in a first location of the non-host-addressable memory 305, data that corresponds to location h3 of the memory map table may be stored in a second location of the non-host-addressable memory 305, data that corresponds to location h5 of the memory map table may be stored in a third location of the non-host-addressable memory 305, and data that corresponds to location h8 of the memory map table may be stored in a fourth location of the non-host-addressable memory 305. The first location, second location, third location, and fourth location may be random locations that are determined based on the scattering algorithm.

As shown by reference number 420, the memory controller 305 may reconstruct the byte string 405 using a gathering algorithm, such as a gather from secret store algorithm, and the secret memory map table 415. For example, using the gathering algorithm, data that is located in a first location of the non-host-addressable memory 305 may be mapped to location d3 of the secret memory map table 415, data that is located in a second location of the non-host-addressable memory 305 may be mapped to location h3 of the secret memory map table 415, data that is located in a third location of the non-host-addressable memory 305 may be mapped to location h5 of the secret memory map table 415, and data that is located in a fourth location of the non-host-addressable memory 305 may be mapped to location h8 of the secret memory map table 415. The byte string 405 may be reconstructed based on the data in the memory map table 405. For example, location a1 of the secret memory map table 415 may correspond to a first bit (or byte) of the byte string 405, location a2 of the secret memory map table may correspond to a second bit (or byte) of the byte string 405, etc.

In some implementations, the scattering algorithm and the gathering algorithm may be dynamic and/or may be application specific. In some implementations, the secret memory map table 415 may point to all fragments of the scattered data that are stored in the non-host addressable memory 305.

In some implementations, the memory device 120 may detect that PUF generation has failed. For example, the memory device 120 may detect that an amount of noise in a generated PUF value has exceeded a noise threshold, or that the memory device 120 has entered a recovery mode. Additional details regarding these features are described below in connection with FIG. 5. In this case, the memory device 120 may access the byte string 405 (e.g., using the gathering algorithm) that includes the PUF protection key 315 and the encrypted PUF value 325. The PUF protection key 315 may be used to decrypt the encrypted PUF value 325, and the resulting decrypted PUF value may be used to access data from within the memory device 120, such as to transfer data from the memory device 120 to another memory device. Therefore, the encryption of the byte string 405 may prevent an intruder from accessing sensitive data from within the memory device 120, while still enabling the data to be accessed from the memory device 120, using the most recently encrypted PUF value, in the event of a PUF failure.

As indicated above, FIG. 4 is provided as an example. Other examples may differ from what is described with regard to FIG. 4.

FIG. 5 is a diagram illustrating example operations 500 for PUF failure prediction. One or more operations described in connection with FIG. 4 may be performed by the system 100, such as the host device 110 and/or the memory device 120.

As shown by reference number 505, the host device 110 may transmit, and the memory device 120 may receive, a command for checking a status of the memory device 120. In some implementations, the command may be a vendor command (e.g., a non-signed vendor command). The vendor command may be a command that is programmed in the memory device 120 for a specific purpose, such as for checking the status of the memory device. In some implementations, the status may be a status of the memory device with respect to PUF generation failure. Thus, the host device 110 may transmit, and the memory device 120 may receive, a vendor command for checking the status of the memory device 120 with respect to the PUF generation failure. For example, the vendor command may be used to prompt the memory device 120 for one or more indicators (described below) that indicate the status of the PUF generation.

As shown by reference number 510, the memory device 120 may transmit, and the host device 110 may receive, a response to the command. In some implementations, the response may include a cycle count indicator. The cycle count indicator may indicate a number of PUF generation cycles performed by the memory device 120. For example, the memory device 120 may generate a PUF value each time the memory device 120 powers on (and/or based on some other trigger), as described above in connection with FIG. 3. The memory device 120 may increment the cycle count indicator each time that the memory device 120 generates the PUF value, and may store the cycle count indicator in memory 140.

In some implementations, the response may include a predictive failure alert (PFA) indicator. The PFA indicator may indicate whether PUF generation failure is predicted to occur for the memory device 120. In some implementations, the PFA indicator may be a PFA flag, or may include a PFA flag. For example, a first value (e.g., 0) of the PFA flag may indicate that a PUF failure is not expected to occur, while a second value (e.g., 1) of the PFA flag may indicate that PUF failure is expected to occur. In some implementations, the PFA indicator may be based on an amount of noise in the PUF. For example, if the amount of noise is less than, or less than or equal to, a noise threshold, the PFA indicator may not indicate the PFA. Alternatively, if the amount of noise is greater than, or greater than or equal to, a noise threshold, the PFA indicator may indicate the PFA.

In some implementations, the response may include a PFA count indicator. The PFA count indicator may indicate a number of times that the PFA indicator has been indicated (e.g., transmitted). As described above, the PFA indicator may be a PFA flag. In this example, the PFA count indicator may indicate a number of times that the PFA flag has been set (e.g., a number of times that a value of the PFA flag has changed from 0 to 1).

In some implementations, the response may include a recovery mode indicator (e.g., a recovery mode flag). The recovery mode indicator may indicate that the memory device 120 is in a recovery mode and that the memory device 120 is to be replaced after a data migration. The memory device 120 may be configured to enter a recovery mode based on the occurrence of one or more conditions, such as one or more conditions that impact the ability of the memory device 120 to store data. The recovery mode may allow the host device 110 and/or a user of the memory device 120 to fix or repair the one or more conditions prior to the memory device 120 entering a fail state.

In some implementations, the response may include a bit field, or may be included in a bit field. For example, the response may include a header portion 520, a data portion 525, and a footer portion 530. The data portion 525 may include a bit field that indicates the status of the memory device 120 with respect to the PUF generation failure. For example, the data portion 525 may include the cycle count indicator, the PFA indicator, the PFA count indicator, and/or the recovery mode indicator. In some implementations, the command and response may need to be enabled for the memory device 120. For example, the memory device 120 may receive (e.g., from the host device 110) a configuration that enables the memory device 120 to receive the command and to transmit a response to the command that indicates the status of the memory device 120 with respect to the PUF generation failure.

As shown by reference number 515, the host device 110 may initiate one or more preventative actions. The host device 110 may initiate the one or more preventative actions based on the response from the memory device 110. For example, the host device 110 may initiate the one or more preventative actions based on the cycle count being greater than, or greater than or equal to, a cycle count threshold. The host device 110 may initiate the one or more preventative actions based on detecting the PFA indicator (e.g., the PFA flag). The host device 110 may initiate the one or more preventative actions based on the PFA count being greater than, or greater than or equal to, a PFA count threshold. The host device 110 may initiate the one or more preventative actions based on detecting the recovery mode indicator (e.g., the recovery mode flag).

In some implementations, the one or more preventative actions may include replacing the memory device 120. For example, the host device 110 may replace the memory device 120 with another memory device that is capable of storing the data within the memory device 120. For example, the host device 110 may stop storing data on the memory device 120, and may store data using one or more other memory devices in communication with the host device 110. The other memory device may be configured with another PUF for generating a PUF value and/or with another PUF protection key.

In some implementations, the one or more preventative actions may include migrating data from the memory device 120. For example, the host 110 may migrate the data from the memory device 120 to another memory device. The data may be migrated from the memory device 120 to the other memory device prior to replacing the memory device 120, after replacing the memory device 120, or simultaneously with replacing the memory device 120.

In some implementations, the one or more preventative actions may include zeroing and decommissioning the memory device 120. For example, the host device 110 may replace the data within the memory device 120 with all zeros (or alternatively, all ones), and may not store any additional data in the memory device 120.

In some implementations, the memory device 120 may reach a PUF failure point based on the cycle count being greater than, or greater than or equal to, the cycle count threshold. The cycle count threshold may be hundreds of PUF generation cycles, or thousands of PUF generation cycles, among other examples. The response to the command may indicate that the memory device 120 is entering a recovery mode. Thus, any additional operation of the memory device 120 can be risky and may result in a loss of data. The host device 110 may initiate the one or more preventative actions based on the indication of the PUF failure point being reached.

In some implementations, each time a PUF value is generated, the memory device 120 may be able to detect an amount of noise in the PUF. The amount of noise in the PUF may increase as the memory device 120 ages. In some implementations, the amount of noise in the PUF may be based on a difference between an expected PUF value (based on the PUF input) and the actual PUF value that is output by the PUF. A larger difference between the expected PUF value and the actual PUF value may indicate a larger amount of noise. The memory device 120 may be configured to track the amount of noise in the PUF in order to estimate a PUF failure point. In some implementations, the memory device 120 may determine that a PUF failure point has been reached based on a noise threshold. For example, the PUF failure point may be reached when the amount of noise becomes greater than, or greater than or equal to, the noise threshold. As the PUF gets closer to the PUF failure point, the predictive failure alert process (for performing the one or more preventative actions) may be initiated. For example, the predictive failure alert process may be initiated when the amount of noise approaches the noise threshold, such as when the amount of noise is greater than, or greater than or equal to, another threshold that is less than (e.g., slightly less than) the noise threshold. Thus, the host device 110 may only transmit the command, receive the response to the command, and initiate the one or more preventative actions, after the PUF failure point has been reached. In some implementations, the predictive failure alert process may only be initiated once the memory device 120 has reached a certain age. The age of the memory device 120 may be determined based on the cycle count and/or based on an amount of error that is detected in the PUF data (e.g., based on a comparison of a previous PUF and a current PUF).

As described above, an intruder may not be able to access the memory device 120 without knowledge of the PUF value. To reduce the likelihood of an attack by the intruder, the PUF value may not be stored in the memory device 120. However, not storing the PUF value in the memory device 120 may result in certain disadvantages. For example, if the PUF were to fail, the memory device 120 may become unusable since it may not be possible to access data that is stored within the memory device 120 without having a PUF value. In some implementations, the memory device 120 may be configured to receive a command for checking a status of the memory device 120 with respect to a PUF generation failure, and to transmit a response to the command that indicates the status of the memory device 120. The host device 110, based on the response to the command, may take one or more preventative actions to prevent data loss from the memory device 120, such as transferring data from the memory device or replacing the memory device.

As indicated above, FIG. 5 is provided as an example. Other examples may differ from what is described with regard to FIG. 5.

Figure 6:
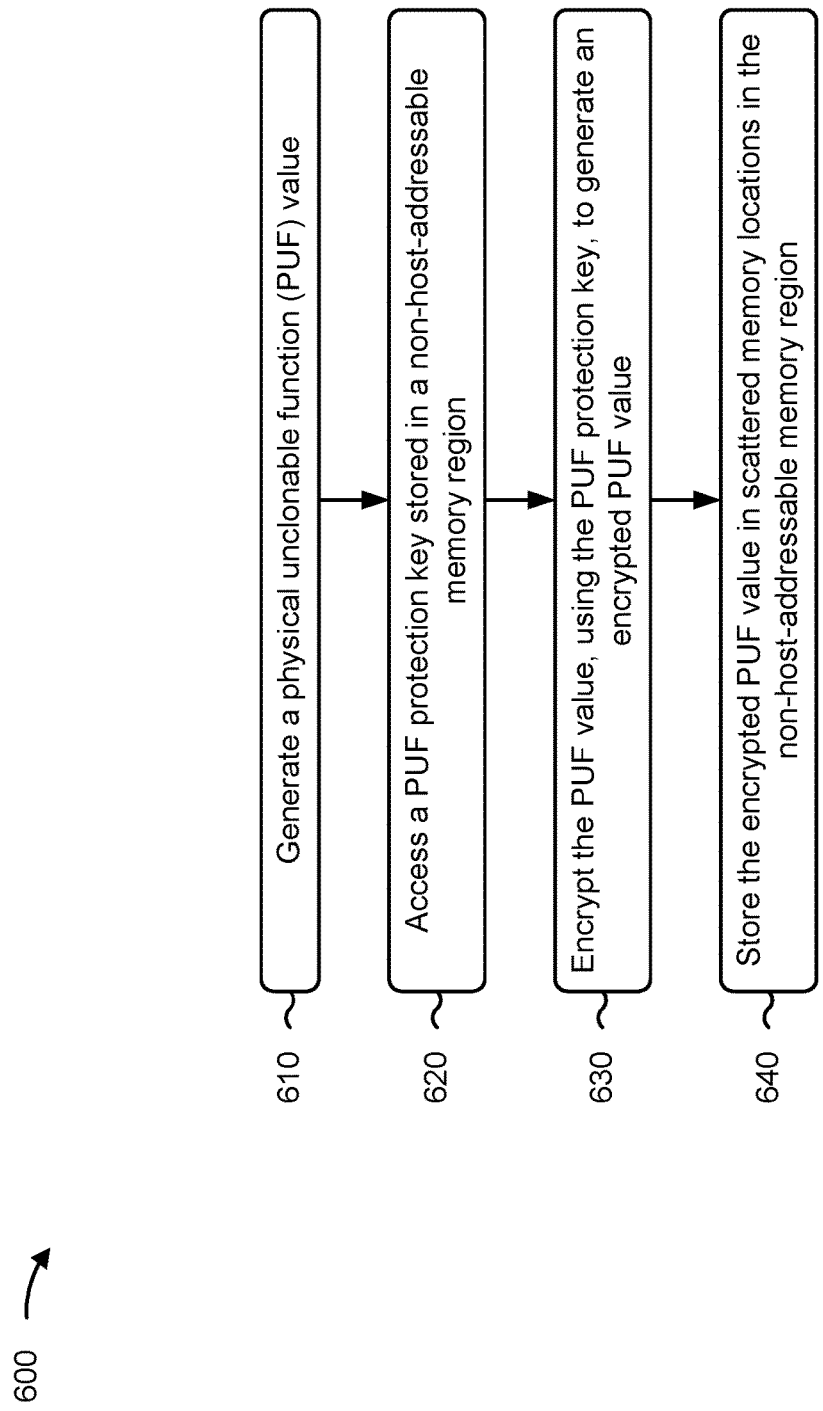

FIG. 6 is a flowchart of an example method 600 associated with physical unclonable function failure protection and prevention. In some implementations, a memory device (e.g., memory device 120) may perform or may be configured to perform one or more process blocks of FIG. 6. In some implementations, another device or a group of devices separate from or including the memory device (e.g., host device 110) may perform or may be configured to perform one or more process blocks of FIG. 6. Additionally, or alternatively, one or more components of the memory device (e.g., memory controller 130) may perform or may be configured to perform one or more process blocks of FIG. 6.

As shown in FIG. 6, the method 600 may include generating a physical unclonable function (PUF) value (block 610). As further shown in FIG. 6, the method 600 may include accessing a PUF protection key stored in a non-host-addressable memory region (block 620). As further shown in FIG. 6, the method 600 may include encrypting the PUF value, using the PUF protection key, to generate an encrypted PUF value (block 630). As further shown in FIG. 6, the method 600 may include storing the encrypted PUF value in scattered memory locations in the non-host-addressable memory region (block 640).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIGS. 3-4.

Figure 7:
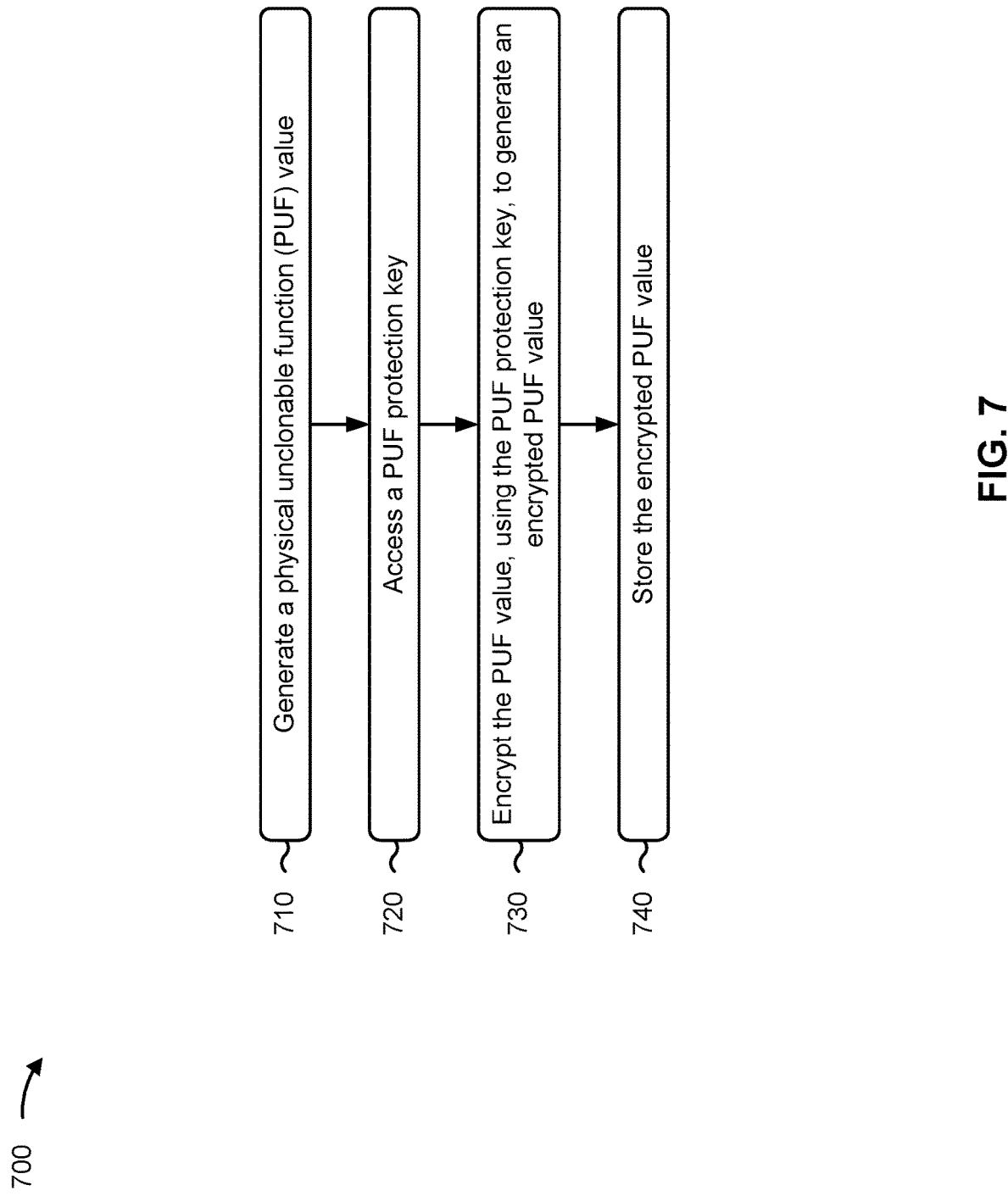

FIG. 7 is a flowchart of an example method 700 associated with physical unclonable function failure protection and prevention. In some implementations, a memory device (e.g., memory device 120) may perform or may be configured to perform one or more process blocks of FIG. 7. In some implementations, another device or a group of devices separate from or including the memory device (e.g., host device 110) may perform or may be configured to perform one or more process blocks of FIG. 7. Additionally, or alternatively, one or more components of the memory device (e.g., memory controller 130) may perform or may be configured to perform one or more process blocks of FIG. 7.

As shown in FIG. 7, the method 700 may include generating a physical unclonable function (PUF) value (block 710). As further shown in FIG. 7, the method 700 may include accessing a PUF protection key (block 720). As further shown in FIG. 7, the method 700 may include encrypting the PUF value, using the PUF protection key, to generate an encrypted PUF value (block 730). As further shown in FIG. 7, the method 700 may include storing the encrypted PUF value (block 740).

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIGS. 3-4.

Figure 8:
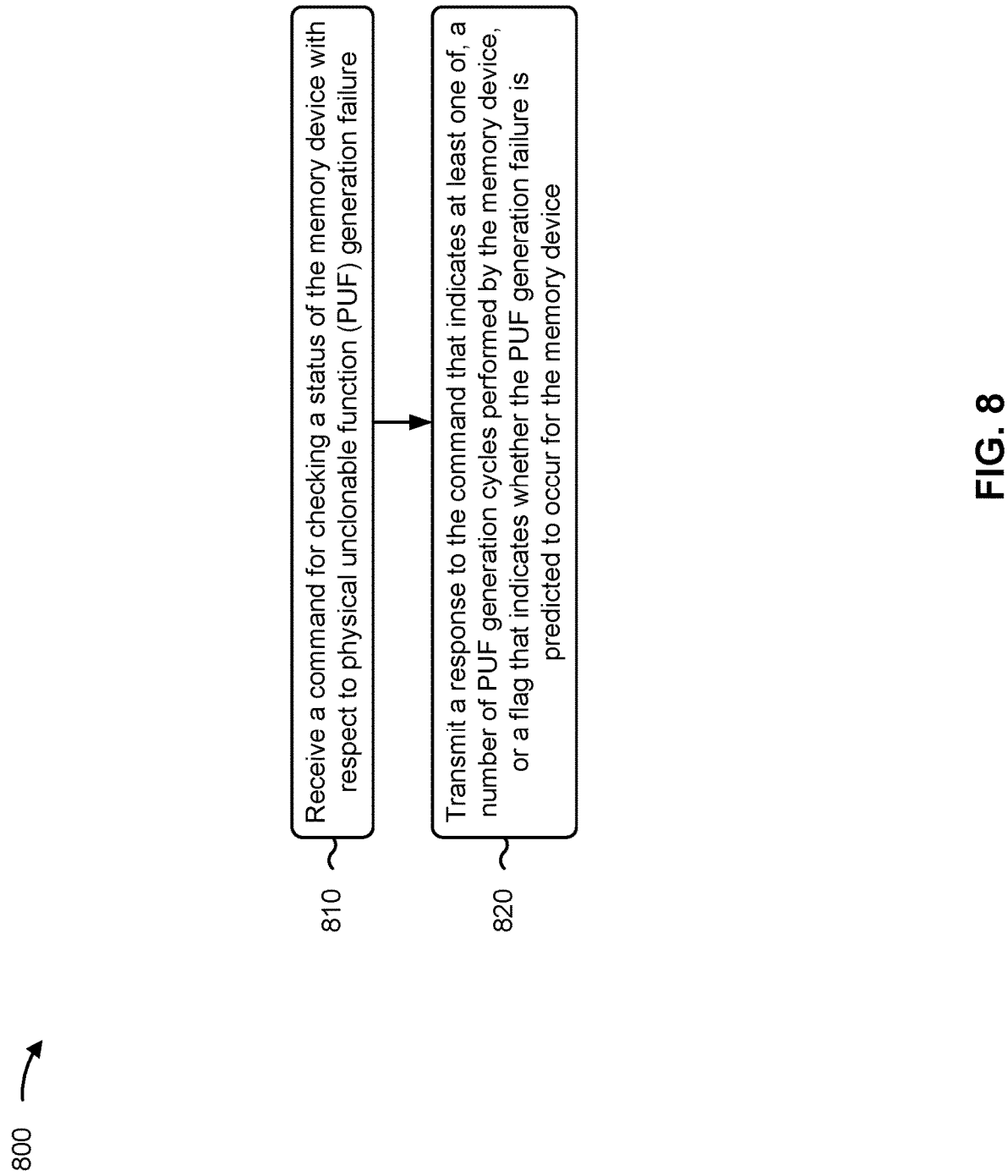

FIG. 8 is a flowchart of an example method 800 associated with physical unclonable function failure protection and prevention. In some implementations, a memory device (e.g., memory device 120) may perform or may be configured to perform one or more process blocks of FIG. 8. In some implementations, another device or a group of devices separate from or including the memory device (e.g., host device 110) may perform or may be configured to perform one or more process blocks of FIG. 8. Additionally, or alternatively, one or more components of the memory device (e.g., memory controller 130) may perform or may be configured to perform one or more process blocks of FIG. 8.

As shown in FIG. 8, the method 800 may include receiving a command for checking a status of the memory device with respect to physical unclonable function (PUF) generation failure (block 810). As further shown in FIG. 8, the method 800 may include transmitting a response to the command that indicates at least one of: a number of PUF generation cycles performed by the memory device, or a flag that indicates whether the PUF generation failure is predicted to occur for the memory device (block 820).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIG. 5.

FIG. 9 is a flowchart of an example method 900 associated with physical unclonable function failure protection and prevention. In some implementations, a host device (e.g., host device 110) may perform or may be configured to perform one or more process blocks of FIG. 9. In some implementations, another device or a group of devices separate from or including the host device (e.g., memory device 120) may perform or may be configured to perform one or more process blocks of FIG. 9.

As shown in FIG. 9, the method 900 may include transmitting a command for checking a status of a memory device with respect to physical unclonable function (PUF) generation failure (block 910). As further shown in FIG. 9, the method 900 may include receiving a response to the command that indicates the status of the memory device with respect to the PUF generation failure (block 920). As further shown in FIG. 9, the method 900 may include initiating a preventative action based on the response indicating that the PUF generation failure is predicted to occur for the memory device (block 930).

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein, such as the operations described in connection with FIG. 5.

In some implementations, a memory device includes one or more components configured to: generate a PUF value; access a PUF protection key stored in a non-host-addressable memory region; encrypt the PUF value, using the PUF protection key, to generate an encrypted PUF value; and store the encrypted PUF value in scattered memory locations in the non-host-addressable memory region.

In some implementations, a method includes generating, by a memory device, a PUF value; accessing, by the memory device, a PUF protection key; encrypting, by the memory device, the PUF value, using the PUF protection key, to generate an encrypted PUF value; and storing, by the memory device, the encrypted PUF value.

In some implementations, a memory device includes one or more components configured to: receive a command for checking a status of the memory device with respect to PUF generation failure; and transmit a response to the command that indicates at least one of: a number of PUF generation cycles performed by the memory device, or a flag that indicates whether the PUF generation failure is predicted to occur for the memory device.

In some implementations, a method includes transmitting, by a host device, a command for checking a status of a memory device with respect to PUF generation failure; receiving, by the host device, a response to the command that indicates the status of the memory device with respect to the PUF generation failure; and initiating, by the host device, a preventative action based on the response indicating that the PUF generation failure is predicted to occur for the memory device.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
two or more components configured to:
generate a physical unclonable function (PUF) value;
access a PUF protection key stored in a non-host-addressable memory region; encrypt the PUF value, using the PUF protection key, to generate an encrypted PUF value; and store the encrypted PUF value in scattered memory locations in the non-host-addressable memory region.

2. The memory device of claim 1, wherein the two or more components are further configured to generate a byte string that includes the encrypted PUF value and the PUF protection key.

3. The memory device of claim 2, wherein the two or more components are further configured to store the byte string.

4. The memory device of claim 2, wherein the two or more components are further configured to store the byte string in the scattered memory locations based on a scattering algorithm and a memory map table.

5. The memory device of claim 4, wherein the two or more components are further configured to reconstruct the byte string based on a reconstruction algorithm and the memory map table.

6. The memory device of claim 4, wherein the memory map table is stored in the non-host-addressable memory region.

7. The memory device of claim 1, wherein the PUF protection key is stored in the memory device at a time of manufacture.

8. The memory device of claim 1, wherein the PUF protection key is used only for encrypting the PUF value.

9. A method, comprising:
generating, by a memory device, a physical unclonable function (PUF) value;
accessing, by the memory device, a PUF protection key;
encrypting, by the memory device, the PUF value, using the PUF protection key, to generate an encrypted PUF value; and
storing, by the memory device, the encrypted PUF value.

10. The method of claim 9, further comprising generating a byte string that includes the encrypted PUF value and the PUF protection key.

11. The method of claim 10, further comprising storing the byte string.

12. The method of claim 10, further comprising storing the byte string in scattered memory locations based on a scattering algorithm and a memory map table.

13. The method of claim 12, further comprising reconstructing the byte string based on a reconstruction algorithm and the memory map table.

14. The method of claim 12, wherein the memory map table is stored in a non-host-addressable memory region.

* * * * *